US007428797B2

(12) United States Patent
Osipenko

(10) Patent No.: US 7,428,797 B2
(45) Date of Patent: Sep. 30, 2008

(54) METHOD FOR DISPERGATING PLANT SEEDS AND DEVICE FOR CARRYING OUT SAID METHOD

(76) Inventor: Sergey Borisovich Osipenko, 1, 16, Bolshaya Zhytomirskaya Street, Kiev 01205 (UA)

( * ) Notice: Subject to any disclaimer, the term of this patent is extended or adjusted under 35 U.S.C. 154(b) by 318 days.

(21) Appl. No.: 10/540,271

(22) PCT Filed: Dec. 18, 2003

(86) PCT No.: PCT/UA03/00053

§ 371 (c)(1), (2), (4) Date: Jun. 23, 2005

(87) PCT Pub. No.: WO2004/056200

PCT Pub. Date: Jul. 8, 2004

(65) Prior Publication Data

US 2006/0251778 A1 Nov. 9, 2006

(30) Foreign Application Priority Data

Dec. 23, 2002 (UA) ........................... 20021210436

(51) Int. Cl.
*A01C 1/00* (2006.01)

(52) U.S. Cl. ................................................. 47/58.1 SE

(58) Field of Classification Search ............. 47/58.1 R, 47/58.1 SE, DIG. 9, 57.6

See application file for complete search history.

(56) References Cited

U.S. PATENT DOCUMENTS 3,950,891 A * 4/1976 Hinkes ....................... 47/57.6
4,249,343 A * 2/1981 Dannelly .................... 47/57.6
4,335,151 A * 6/1982 Caubet ....................... 426/482
5,300,127 A * 4/1994 Williams .................... 47/57.6
5,333,392 A * 8/1994 Heinze ........................ 34/363

(Continued)

FOREIGN PATENT DOCUMENTS

GB 1295731 A 11/1972

(Continued)

*Primary Examiner*—T. Nguyen
(74) *Attorney, Agent, or Firm*—McDermott Will & Emery LLP

(57) ABSTRACT

The process for dispersing plant seeds comprises the steps of feeding a suspension of seeds in an aqueous medium into an axially symmetric vertical device until its circulation circuit including a pump and piping is filled up, dispersing the seeds by pumping the suspension through the circulation circuit closed, involving turbulent motion and attended heating of the flow of the suspension upstream of the device, and spirally whirling the flow within the device until a product of a predetermined consistency and temperature is obtained, degassing and discharging the product. To suppress destruction and oxidation of oils and/or proteins, the pumped suspension is whirled into a spiral of a radius decreasing from top to bottom and is drawn off for circulation through a central opening in the bottom of the device, the step of degassing is carried out not later than an axially symmetric funnel-shaped depression is formed in the whirling suspension and after the product has become as homogenous and heated throughout as desired, the process is discontinued and the circulation circuit is evacuated. The apparatus for carrying out the process comprises a flow-through device a cross section decreasing from top to bottom and an opening in the bottom portion of the device for connecting to the suction side of the pump.

9 Claims, 6 Drawing Sheets

U.S. PATENT DOCUMENTS 5,586,412 A * 12/1996 Wadlington .............. 47/58.1 R
6,557,298 B2 * 5/2003 Obert et al. .................. 47/57.6

FOREIGN PATENT DOCUMENTS

| | | | |
|---|---|---|---|
| RU | 2030883 | | 12/2007 |
| SU | 104306 | A | 9/1954 |
| SU | 1629312 | A1 | 2/1991 |
| UA | 40263 | A | 7/2001 |
| UA | 42365 | A | 10/2001 |
| WO | WO 98/42987 | | 11/1990 |

* cited by examiner

METHOD FOR DISPERGATING PLANT SEEDS AND DEVICE FOR CARRYING OUT SAID METHOD

RELATED APPLICATION

This application is the U.S. National Phase under 35 U.S.C. § 371 of International Application No. PCT/UA2003/000053, filed Dec. 18, 2003, which in turn claims the benefit of Ukrainian Application No. 20021210436, filed Dec. 23, 2002, the disclosures of which Applications are incorporated by reference herein in their entirety.

TECHNICAL FIELD

This invention relates to a process for preparing aqueous dispersions of plant seeds wherein dispersing of a starting material is combined with degassing and heat treatment of viscous and pasty intermediate and final products to inhibit pathogenic microflora. The invention also relates to an apparatus built around a batch-operated flow-through device as the basic unit for carrying out such process.

The invention can be particularly useful in the manufacture of pasty foodstuffs from oilseeds such as soybeans, pine kernels, walnuts and other nuts as well as mixtures thereof.

Also, the invention can be useful in its application to prepare pasty intermediates for baked, preferably dietary, goods from whole cereals, particularly with oilseed additives.

BACKGROUND ART

It is common knowledge that many foodstuffs are sold as emulsions and/or suspensions prepared by dispersing a suitable stock in an aqueous medium and at least pasteurizing (usually sterilizing) the final suspensions.

It is to be understood that an "aqueous medium" means herein moisture inherently present in the stock, potable water, weak suspensions of food and flavor additives in water, moisture inherent in the stock, and the water added as required by the specifications for moisture content of the final product.

Also, it is to be understood that oilseeds, which contain high concentrations of vegetable proteins and highly volatile oils of unsaturated fatty acids when dry, cannot be processed to obtain aqueous dispersions using conventional techniques such as grinding to produce flour and mixing the flour with an aqueous medium until a desired body of "milk" or paste is obtained.

As a consequence, many processes for preparing protein-oil suspensions from soybeans and/or nuts (RU 2030883 and UA 40263A) comprise soaking the stock in preferably warm potable water until swollen, removing at least a part of protective coats that have become loose, comminuting the resulting coarse suspension to produce a finely dispersed end product with a desired proportion of solids, and sterilizing the end product by heating to a temperature not exceeding 100° C.

Food and flavor additives, such as sodium chloride, mono- and/or disaccharides, vitamins, microelements and the like are added either into the water for soaking or to the suspension of seeds in an aqueous medium in the process of dispersing the seeds.

The dispersing of stock followed by heat treatment of the semi-finished product prior to packaging is suitable for the production of fluid substances such as soybean milk or its modifications.

And yet pasteurization and especially sterilization of such products by an outside heat source has been a problem in that the walls of heat exchangers quickly get covered with a compact residue that is hard to remove and hence it is not practical to subject viscous, especially pasty, products to heat treatment in conventional heat exchangers.

Consequently, preferred are such processes and apparatus that are capable of inhibiting pathogenic microflora while stock is being processed for preparing high-viscosity products from oilseeds. In this way, the more efficient is the equipment and higher product sterility requirements, the lower are the costs of the process equipment, floor area and maintenance.

The first step along these lines is believed to have been made in the process that can be carried out in the apparatus disclosed in WO 98/42987 and illustrated in the attached drawings, particularly drawing FIGS. 8 and 9. The apparatus comprises a continuous-action pump and vertically disposed, generally rectangular in cross section, flow-through vessel, which is connected to a source of the fluid to be processed and to at least one user of the processed fluid through a delivery line and a discharge line respectively. The bottom portion of the vessel is connected through a circulation line to the suction side of the pump and its upper portion through a hydrodynamic cavitation stimulator to the delivery side of the pump.

The hydrodynamic cavitation stimulator is a pipe of a relatively large cross section with two symmetrical bypass pipes of a smaller cross section adapted to take off some fluid from the pump and to return it in thin disturbing streams running contrary to the main flow.

It is now common knowledge that controlled turbulence and cavitation in a circulating fluid flow are attended with a heat evolution, so the above-described apparatus is suitable for dispersing plant seeds and simultaneously heat treating the resulting dispersions.

Nevertheless, where the hydrodynamic cavitation stimulator is connected to the upper portion of the flow-through vessel having an invariable cross section adjacent its symmetry plane from top to bottom, the dispersing action practically ceases within the vessel to necessarily result in a dead zone adjacent to the bottom and in a sediment of coarse particles.

Prolongation of the dispersing action in turbulent flow (due to collisions of particles in a vortexlike motion) and a substantial decrease in sediments at the bottom (due to partially stirring it up) have been to some extent gained by way of whirling the flow of the aqueous medium. This has been achieved in a flow-through device having an axially symmetric process chamber.

The prior art processes for dispersing plant seeds, bearing closely on the invention, are disclosed in UA Patent 42365 A (specifically drawing FIGS. 13 and 14, and the corresponding portions of the description).

The prior art process for dispersing plant seeds in an aqueous medium is intended for continuous operation in a circulation circuit made up of an axially symmetric flow-through device (referred to in the patent as a means for continuously fractionating the turbulent flow of a fluid), a continuous-action pump and a suitable piping including at least one means for stimulating turbulent flow (capable of causing cavitation), which is built in the delivery line.

The process comprises:

(a) preparing a batch of starting suspension of seeds in an aqueous medium, (b) starting the process, which incudes:

charging the batch by tangentially feeding the same via an open feeding line to a substantially vertically disposed flow-through device having an axially symmetric process chamber, the device being connected with its bottom portion through a suction line to the pump and with its upper portion through a delivery line to the means for stimulating turbulent flow, dispersing (as the feeding continues) the plant seeds in the aqueous medium by pumping the suspension through the circulation circuit (the discharge outlet being closed) to cause the suspension move in turbulent flow with attended heating thereof prior to its entry into the flow-through device and whirling the flow within the device, cutting off feeding when the circulation circuit has been filled up and the product with the seeds of a predetermined size and heated up to a predetermined temperature has been obtained, gradually and simultaneously opening the discharge outlet and the delivery line until a continuous steady-state operation, including degassing, is achieved, wherein stock feeding and product discharge are in balance while the product temperature is practically constant;

(c) continuous steady-state operation, wherein the circulating flow of an intermediate product with the starting suspension being admixed is continuously fed through said feeding line onto the wall of the flow-through device at its upper portion, the product is continuously degassed and discharged for packaging through a central discharge outlet in the cover of the device, and the intermediate product to be further circulated is continuously withdrawn from the bottom portion of the device at substantially right angles to its axis and conveyed through the circulation line to the pump;

(d) discontinuing the process by cutting off the feeding of the starting suspension and subsequently sweeping the device free of residues of the intermediate product.

The advantage of this process consists in that the intermediate product, as a result of whirling the flow, is adequately divided by centrifugal force into two fractions, one of which is rich in coarse seed particles and is circulated, while the other is sufficiently homogenized and is good for discharge.

The apparatus for carrying out the above-described process comprises:

(a) a substantially vertical flow-through device comprising a hollow housing having a flat cover and a bottom, an axially symmetric round process chamber of an invariable cross sectional area from top to bottom, and a flat dividing plate having a central opening and exposed adjacent the cover and dividing the chamber into the lower part for dispersing stock and heat treating the intermediate product, and the upper part of a substantially smaller volume and communicating with the atmosphere, for degassing the target product;

(b) a continuous-action circulating pump having the suction side connected to the device at its bottom portion, while the delivery side of the pump is connected through at least one tangential line to the upper portion of the device below the dividing plate;

(c) at least one means for stimulating turbulent flow (capable of causing cavitation) arranged between the delivery side of the pump and the inlet of the housing communicating with at least one tangential delivery line;

(d) a feeding line for feeding stock to the dispersion area, which feeding line being optionally connected to the inlet of the means for stimulating turbulent flow;

(e) an axially symmetric round flow-through thermostatically-controlled chamber for the target product, which chamber is of a smaller diameter than the process chamber, is rigidly attached to the dividing plate and has an inlet in the bottom end wall, which inlet is coaxial with the opening in the dividing plate;

(f) a pipe for discharging the end product, which pipe is connected to the degassing chamber via a substantially central opening in the cover of the flow-through device;

(g) valves built in at least the feeding line and the pipe for discharging the end product.

In practice, such apparatus have proved useful in the production of both soybean milk and viscous products from soybeans and hence from other oilseeds. In the thermostatically-controlled chamber, which is arranged in the area of greatest possible temperatures, it has been possible to heat the target product to a temperature sufficient for taking substantial moisture (together with gases that have escaped from the target product) to the atmosphere.

However, even with continuous dividing of the whirling flow into two fractions the continuous feeding of whole seeds to the peripheral zone of the device for dispersing coincident with the continuous taking of the mobile dispersion for thermostatic control followed by the discharge of the condensed product through the central opening in the cover of the device is possible on condition that the described apparatus is provided with at least one means for stimulating turbulent flow that is capable of stimulating vigorous cavitation within the circulating fluid.

It is obvious for those skilled in the art that the more vigorous is cavitation, the higher temperature of the fluid in the process chamber is attainable. In particular, the temperature can exceed 120° C., at times 130° C. Such temperatures and intensive mixing of the matter being dispersed result in thermomechanical and thermochemical destruction of oils and proteins, which alone may deteriorate organoleptic quality of the product, especially where the flow of seed particles is being slowed down and they are settling to the bottom where they undergo prolonged heating.

Also, it has been experienced that the aqueous media used in dispersing soybeans necessarily contain dissolved air, oxygen included; and an appreciable amounts of air are drawn into the circulation circuit together with stock being continuously fed.

Under vigorous cavitation, the molecules of dissolved air can break down to atoms. In such singlet state, chemical activity of oxygen drastically increases to cause uncontrolled oxidation destruction of oils and proteins and, consequently, to more noticeable quality deterioration of the pasty products produced from oilseeds.

As a consequence, the prior art process and apparatus are usually used to produce slightly condensed soybean milk for use as fodder or an ingredient of combination fodder for grazing farm animals.

DISCLOSURE OF THE INVENTION

The present invention aims to provide:

first, a process for dispersing seeds, preferably oilseeds, in an aqueous medium, which will substantially decrease thermomechanical and thermochemical destruction of oils and/or proteins and make possible the production of viscous and pasty products having no flaws as to organoleptic quality, and second, an apparatus for carrying out said process under periodic operation, which insures attainment of said result.

The problem underlying this invention has been resolved by a process for dispersing plant seeds in an aqueous medium, the process comprising the steps of feeding a batch of plant seeds and an aqueous medium into a substantially vertical flow-through device having an axially symmetric round process chamber, which device being connected through a suction line at the bottom portion thereof to a pump and through a delivery line at the upper portion thereof to at least one means for stimulating turbulent flow, priming at least the suction line and the pump with at least an aqueous medium, dispersing the plant seeds in the aqueous medium by pumping the suspension of the seeds in the aqueous medium through a closed circulation circuit involving a turbulent motion and attended heating of the flow of the suspension upstream of the flow-through device and spirally whirling the flow within the device until a product of a predetermined consistency and temperature is obtained, degassing and discharging the product for packaging, wherein according to the invention the flow of the suspension is whirled into a spiral of a radius decreasing from top to bottom and is drawn off for circulation through a central opening in the bottom of the device, [is forced along a spiral path of a configuration of an inverted cone]

the step of degassing is carried out not later than an axially symmetric funnel-shaped depression is formed in the whirling suspension and after the product has become as homogenous and heated throughout as desired, the process is discontinued and the circulation circuit is evacuated for the next process.

In such periodic process, it is possible to confine the flowing particles, being disintegrated, within the process chamber of the flow-through device to thus homogenize the intermediate product (during each process cycle) and the target product (at the end of such cycle);

to adequately degas even pasty materials (air being forced out into the funnel-shaped depression and further to the upper portion of the flow-through device wherefrom most of the gases are easily withdrawn well before the circulating suspension is heated to the temperature exceeding 100° C.) and to essentially preclude the settlement of seed particles to the bottom of the chamber.

Consequently, the probability of oxidation destruction of oils and/or proteins is substantially reduced and palatable pasty products are produced.

One aspect of the invention consists in that the radius of the spiral is gradually decreased from top to bottom. This enhances the above-described result.

One more aspect of the invention consists in that at least a part of the aqueous medium is fed to the circulation circuit prior to feeding the seeds thereto. This provides for a stable circulation flow, even though the seeds may be soaked and tending to stick together.

Still one more aspect of the invention consists in that the suspension is pumped into the flow-through device in at least two streams at various distances upward from the opening in the bottom of the device. Such additional whirling of the stock is especially advantageous for intermediate products whose viscosity rapidly increases.

Another aspect of the invention consists in that the gas removed from the process chamber is replaced with at least an aqueous medium. Pasty products with a minimum of dissolved gases and correspondingly palatable on long storage are thus produced.

One more another aspect of the invention consists in that the end product prior to the step of discharging is heated to a temperature not exceeding 100° C., i.e. to temperature level that keeps oxidation destruction of oils and/or proteins to a minimum.

The problem underlying this invention has also been resolved by an apparatus for dispersing plant seeds in an aqueous medium, comprising a substantially vertical flow-through device comprising a housing normally closed with a cover and defining an axially symmetric round process chamber communicating with means for discharging gas at the top thereof and with an end product discharge line;

a circulation circuit built around a continuous-action pump, whose suction side is connected through a suction line to an opening in the bottom of the housing and delivery side is connected through a delivery line to the inlet to the housing above the opening at least at one point;

at least one means for stimulating turbulent flow incorporated into the circulation circuit upstream of the inlet to the housing to set the flow of a circulating fluid into turbulent flow; and at least two valves, one to control means for discharging gas and another to control the end product discharge line, wherein according to the invention the process chamber is tapered from top to bottom, the angle ($\alpha$) between the radius of the circumference of the inner wall of the housing and the axis of the delivery line at the point of entry into the housing, wherein the vertex of the angle is substantially coincident with the point of intersection of said axis and the generatrix of the inner wall, is within the range of $30° \leqq \alpha < 90°$, the opening in the bottom of the housing is set true with the axis of symmetry of the housing, the end product discharge line is connected to the suction line, the cover is removable and has at least one orifice adapted to connect the apparatus to means for discharging gas.

In such apparatus, plant seeds are dispersed and the dispersion is heated concurrently with the confinement of the flowing particles, being disintegrated, within the process chamber. Under such conditions, separation of the turbulent flow of the fluid, being fed into the process chamber, from the wall, which separation is attainable within the range of angles $\alpha$, and taking off the fluid through the opening in the bottom and pumping it back into the circulation circuit results in that firstly, in the whirling body of the processed stock, a funnel-shaped depression is formed, which depression is coaxial with the process chamber and into which (as into a dynamic void emerging in the centrifugal force field) gases escape to be withdrawn through the means for discharging gas, and secondly, the settlement of seed particles to the bottom of the chamber is essentially precluded.

Thus, the apparatus of the invention is structured to carry out the process of the invention with the above-mentioned substantial reduction in the probability of oxidation destruction of oils and/or proteins and the production of invariably palatable pasty products.

The apparatus is further characterized in that the process chamber is defined by a cylindrical surface at the upper portion thereof and by a conical surface at the lower portion, both surfaces being smoothly conjoint. Such construction is simple to produce and convenient in service.

The apparatus is again further characterized in that the process chamber is defined by a paraboloidal surface. Such chambers provide for the simplest maintenance of a constant flow of the particles being disintegrated throughout the process volume of the apparatus.

The apparatus is still again further characterized in that the process chamber is defined by a spheroidal surface. Such process chambers are fairly simple to produce and provide for essentially acceptable equalization of particle velocities within the process volume of the apparatus.

The apparatus is once again further characterized in that the angle (α) is within the range of 60°≦α<90°. This is a subrange that provides for the most advantageous formation of the funnel-shaped depression in the whirling flow of stock.

The apparatus is still further characterized in that the delivery line is connected to the inlet to the housing at least at two points through individual pipes arranged at different levels. This embodiment enables inactive stabilization of the particle motion within the process volume of the apparatus attainable by narrowing its flow section to be supplemented with active or controlled stabilization.

The apparatus is furthermore characterized in that each of the individual pipes is provided with a valve, whereby the circulation circuit can be adjusted to advantage to stabilize the flow of the processed particles throughout the process volume of the apparatus.

Also, the apparatus is further characterized either in that a tubular receptacle for a batch of seeds to be dispersed is coaxially set up within the process chamber above the opening, the upper end of the tubular receptacle being open and flush level with the inlet to the chamber and the lower end thereof being provided with a coaxially arranged plate to slow down the seeds leaving the tubular receptacle, or in that an overflow pipe is coaxially set up within the process chamber, the upper end of the overflow pipe being open and above the inlet to the chamber and the lower end thereof extending in annular space relationship with the suction line along a section thereof.

In the former embodiment, the seeds to be dispersed must be fed, prior to the starting of the process, into said tubular receptacle, while in the latter embodiment, into the space defined by the wall of the process chamber and the overflow pipe.

It is to be understood that the aforementioned accessory features make it possible to fill the circulation circuit with the aqueous medium at least partially, i.e. by filling the suction line and the pump, at the beginning of each process cycle, while the seeds may be fed progressively thereafter. In this way, blocking of the circulation circuit with whole seeds is essentially precluded.

This invention may be variously otherwise embodied and various changes in the shape, size and arrangement of parts may be resorted to, without departing from the scope of the appended claims.

BRIEF DESCRIPTION OF THE DRAWINGS

The invention will now be explained in greater detail with reference to the accompanying drawings, wherein.

BEST MODE FOR CARRYING OUT THE INVENTION

Figure 3:
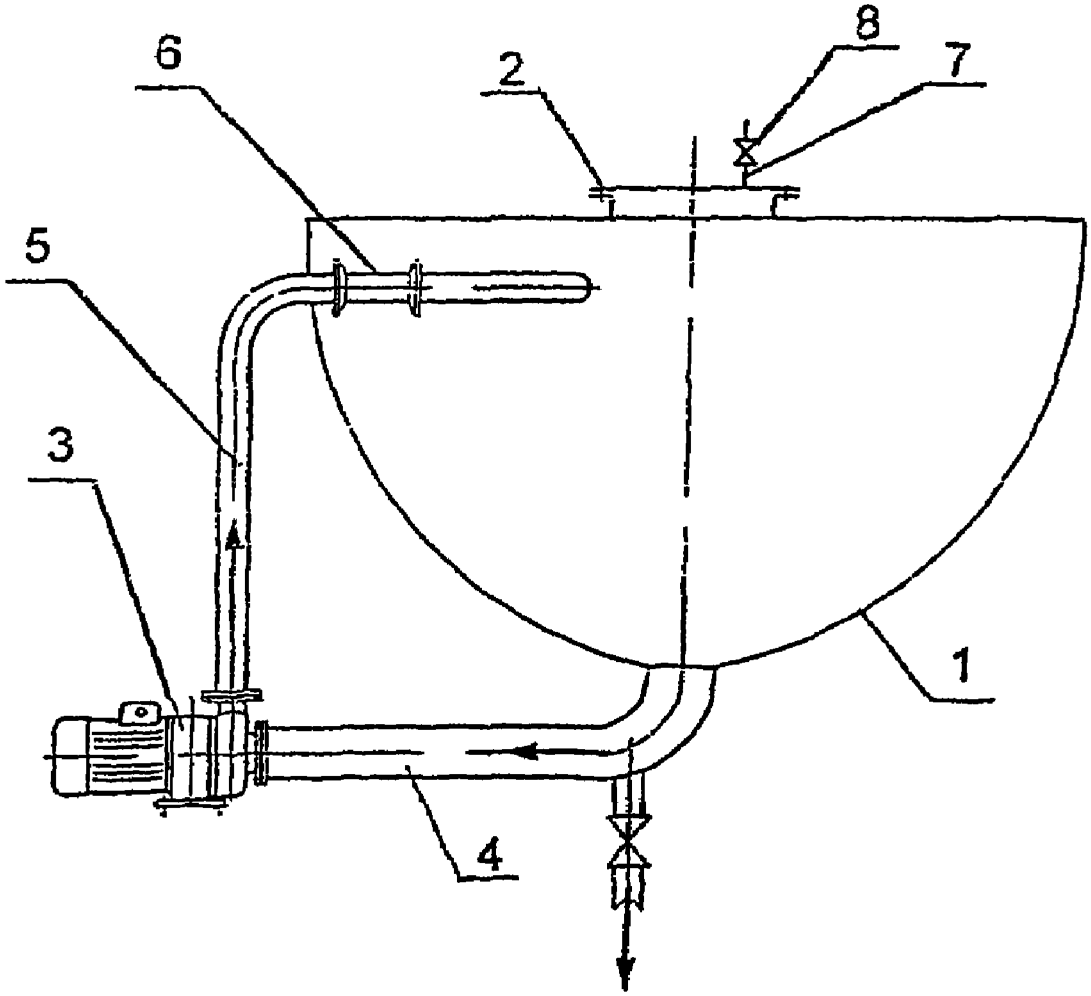
FIG. 3 is a schematic representation of an alternative embodiment of the apparatus of the invention with the flow-through device shaped as a spheroid.

The apparatus for dispersing plant seeds in an aqueous medium generally comprises (FIGS. 1, 3 and 6):

a substantially vertical flow-through device comprising a housing 1 defining an axially symmetric round process chamber tapering from top to bottom and normally closed with a removable cover 2, preferably hinged, and extending downwardly to gradually terminate in a through opening (not designated) disposed coaxially with the chamber;

a circulation circuit built around a continuous-action pump 3 (e.g. a centrifugal pump), whose suction side is connected through a suction line 4 to an opening in the bottom of the housing 1 and the delivery side is connected through a delivery line 5 to the inlet of the housing 1 at least at one point;

at least one means 6 for stimulating turbulent flow incorporated into the circulation circuit upstream of the inlet to the housing 1 (usually built in the delivery line 5 or in at least one pipe branching out therefrom);

means 7 for discharging gas, communicating through the cover 2 with the process chamber of the housing 1 and herein exemplified by a branch pipe with a valve 8 built therein as a nonrestricting embodiment;

a pipe line 9 for discharging the end product from the housing 1 branched from the suction line 4 and having a valve 10 built therein.

Figure 2:
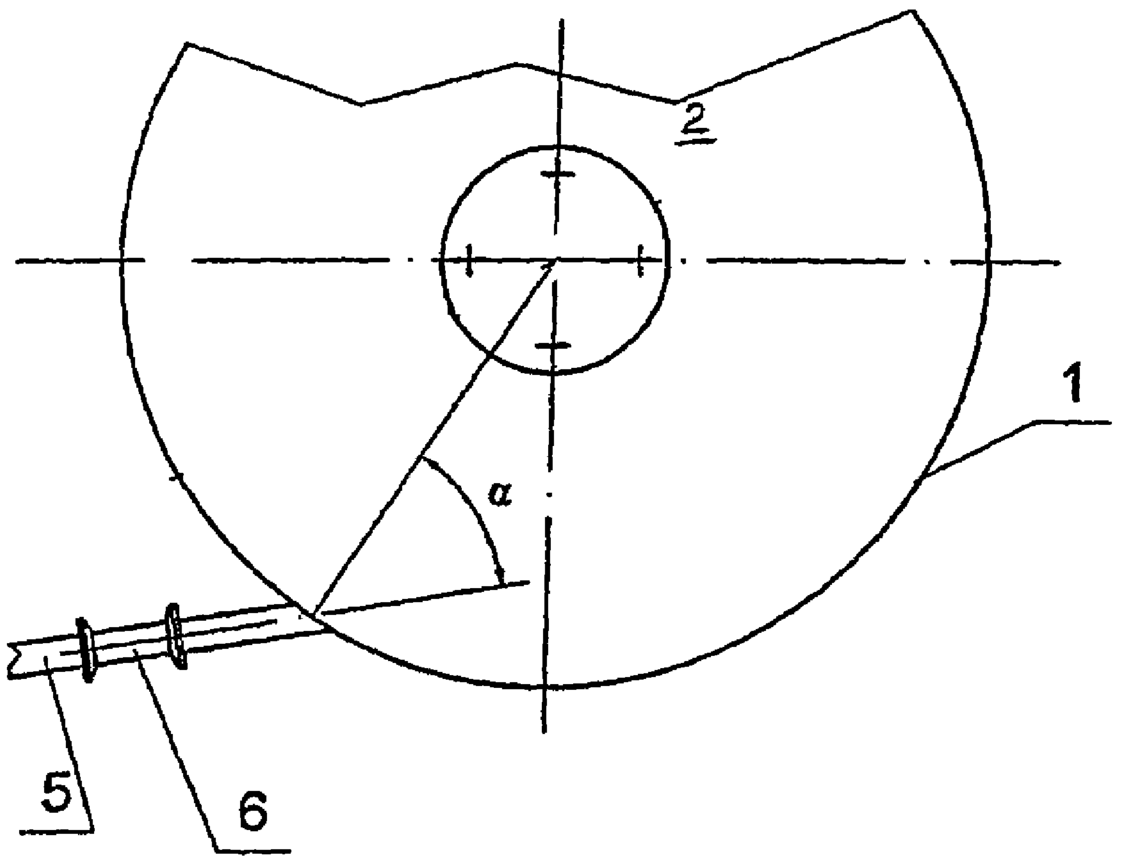
FIG. 2 is a diagrammatic cross sectional view of the process chamber depicting the manner of feeding the fluid with respect to the chamber wall.

An essential feature of the invention is the angle α. As can be seen in FIG. 2, this angle is made by the radius of the circumference bounding the process chamber, or inner wall, of the housing 1, which intersects the axis of the section of the delivery line 5. The vertex of this angle is substantially coincident with the point of intersection of said axis and the generatrix of the inner wall defining the process chamber. To cause whirling of the incoming flow and formation of a funnel-shaped depression, this angle must be within the range of 30°≦α<90°, preferably 60°≦α<90°.

Figure 1:
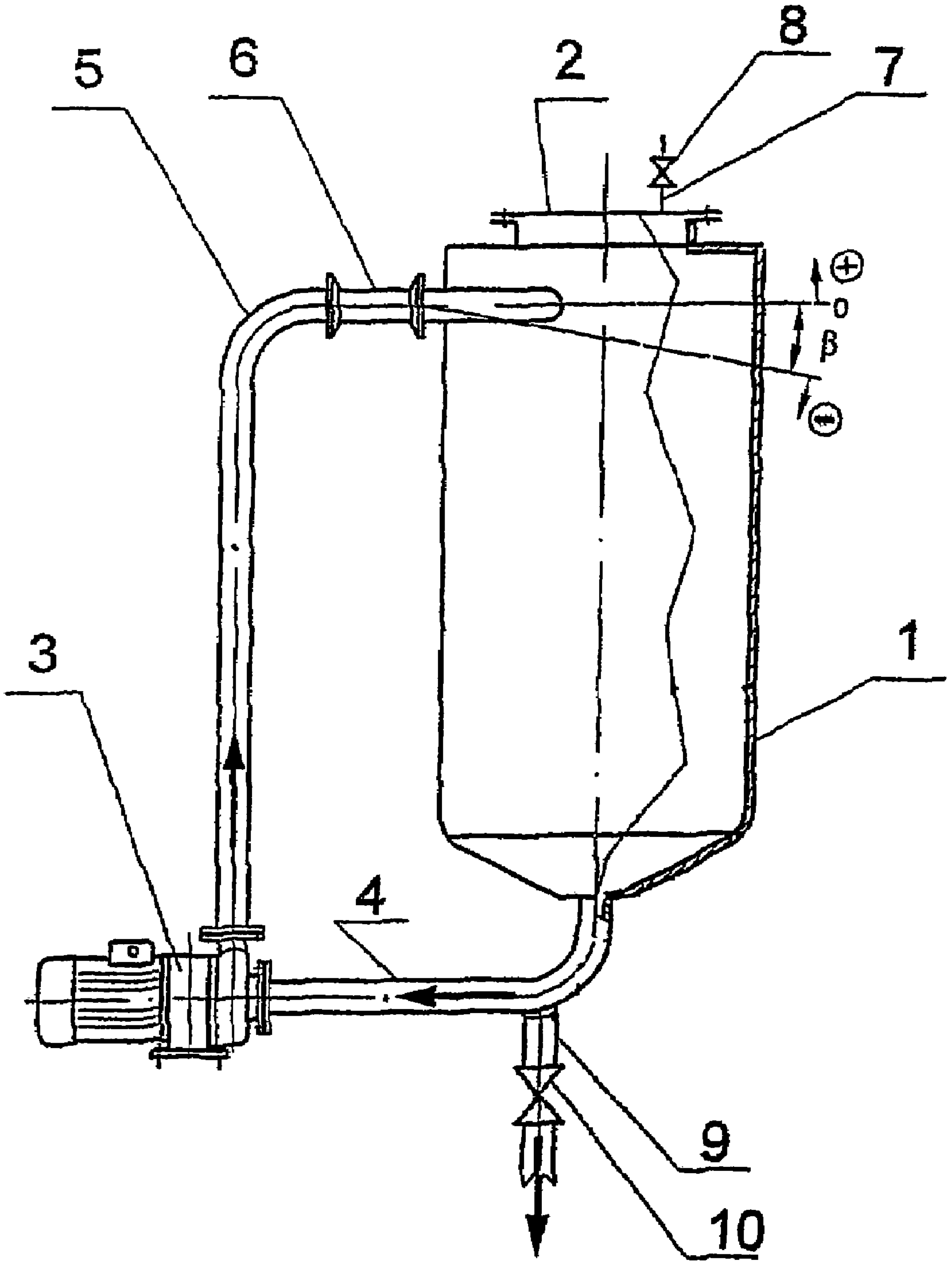
FIG. 1 is a schematic representation of one embodiment of the apparatus of the invention with the flow-through device shaped as a combination of a cylinder and cone.

Sometimes, as may be required, the angle β will be adjusted (FIG. 1). This angle may be formed by the axis of the section of the delivery line 5 and its projection on the cross-sectional plane through the housing 1 at right angles to its axis of symmetry, which axis and projection emanating from the point of intersection of the axis with the generatrix of the inner wall surface defining the process chamber. This angle is useful to account for the effect of the suction force with which the circulating fluid is drawn from the housing 1 by the pump 3 and it also affects the efficiency of whirling the flow within the process chamber. This angle would be appropriate in the range of +1.0°≦β≦−15°, preferably 0°<β<−15°, where the plus sign means upward deflection and the minus sign downward deflection. Nevertheless, in some uses of the invention an angle of 0° will be as well appropriate.

It will be apparent for those skilled in the hydraulics art that means 6 for stimulating turbulent flow can be any means capable of disturbing laminar flow or abruptly stimulate turbulent flow. Such means can be represented by at least the following:

(a) mechanical means, such as a so-called bluff body rigidly fixed within the line for circulating fluid (cf. UA 8051 A and 17850 A, RU 2131094 C1) or an ultrasonic generator attached to the line for circulating fluid (cf. SU 1628994 A1, UA 25035);

(b) hydraulic (jet) means, e.g. at least one opening in the wall of the line for circulating fluid, through which a disturbing stream of the same fluid runs contrary to the main flow at an angle ranging from −60° to +45° (WO 98/42987, drawing FIGS. 1-3, 5 and 6; pages 10 and 11, page 12, lines 1-37, and page 14, lines 2-16, of the present inventor), and (c) combination means, such as a bluff body fixed on a hollow bracket within the line for circulating fluid and an opening in the bluff body, through which a disturbing stream runs contrary to the main flow (Sedow, L. I., Continuum Mechanics, Vol. 2, Moscow, 1976, p. 82 [in Russian]), or the sound duct of an ultrasonic generator in acoustic contact with the wall of the line for circulating fluid and at least one opening in the wall of the line for delivering a disturbing stream, or a bluff body fixed on a hollow bracket within the line for circulating fluid and at least one ultrasonic generator in acoustic contact with the wall of the line.

In one embodiment of the invention (FIGS. 1, 4 and 5), the process chamber of the housing 1 is defined in its upper portion by a cylindrical surface and in the lower one by a conical surface smoothly joining the upper portion surface. It is to be understood that the angle contained by the generatrix of the conical surface and the horizontal must be greater than the angle of slope for wet seeds. For practical purposes, this angle will not be less than 12°.

In another embodiment, the process chamber of the housing 1 is defined by a spheroidal (FIG. 3) or paraboloidal (FIG. 6) surface. Spheroidal housings can be easily manufactured by extrusion, while paraboloidal housings provide for optimizing particle motion and thus homogenizing pasty intermediate products in a shorter time while they circulate.

To enhance homogenizing and, consequently, the apparatus efficiency, the delivery line 5 is branched into at least two, preferably three individual pipes 11, 12, and 13, which extend toward and connected to the housing at three points arranged one above the other and are provided with valves 14 and means 6 for stimulating turbulent flow.

In an alternative embodiment, the process chamber of the housing 1 has a means for feeding an aqueous medium and seeds separately prior to each processing cycle to thus simplify the starting of the process. The means is preferably constructed as a tubular receptacle 15, the upper end of which is open and is flush level with the inlet of the chamber, while its lower end is provided with a coaxially arranged plate 16 adapted to slow down the flow of the seeds leaving the receptacle (FIG. 4) or an overflow pipe 17 coaxially set up within the process chamber, the upper end of the pipe 17 being open and above the inlet to the process chamber, while the lower end extending in annular space relationship with the suction line 4 along a section thereof (FIG. 5).

The plate 16 can be variously designed to meet specific processing conditions depending on the kind of seeds to be processed. The plate can be a disk arranged below the tubular receptacle 15 and mounted in concentric space relationship with the inner wall of the chamber on radial supports, or a movable cone adapted to control the space between the tubular receptacle 15 and its own surface.

Regardless of the specific construction of the apparatus according to the invention, the process of the invention comprises the following steps:

(a) feeding a batch of plant seeds and an aqueous medium into the process chamber of the housing 1;

(b) priming at least the suction line 4 and the pump 3 with at least an aqueous medium;

(c) dispersing the plant seeds in the aqueous medium by pumping the suspension of the seeds in the aqueous medium through the flow-through device (the cover closed) involving a turbulent motion and attended heating of the flow of the suspension upstream of the housing 1 and spirally whirling the flow within the housing into a spiral of a radius decreasing from top to bottom until a product of a predetermined consistency and temperature is obtained;

(d) degassing the product not later than an axially symmetric funnel-shaped depression is formed in the whirling suspension by withdrawing escaping gases via means 7, (the funnel-shaped depression, in the device shown in FIG. 4, can be formed within and/or around the receptacle 15 according to the position of its upper end with respect to the inlet of the housing 1; and in the device shown in FIG. 5 it is generally formed around the overflow pipe 17);

(e) continuing the process until the product is as homogenous and heated throughout as desired; and (f) discontinuing circulation and discharging the product for packaging, i.e. the circulation circuit is evacuated for the next process.

Prior to feeding, the seeds are soaked in an aqueous medium in the proportion about 1 part seeds to 3 parts aqueous medium for 12 to 24 hours at room temperature, or usually for three hours at most at a temperature ranging from 50 to 70° C.

It has been usual practice to remove protective coats that have become swollen or loose from the seeds though the coats are rich in fibers.

The process and apparatus of the invention, however, are suitable for processing both soybeans and nuts (pine kernels as well), whole and without soaking in water. In this way fibers remain in the product and act in the alimentary canal of humans and farm animals, especially finely divided, not only as a coarse (inert) material but as an enterosorbent useful in removing toxic substances from the organism.

Prior to loading into the flow-through device, large-sized nuts, such as walnuts, babassu nuts, hazelnuts, peanuts and palm nuts, are best crushed to particle size that will not impede free flow through the circulation circuit at the beginning of the process.

Figure 4:
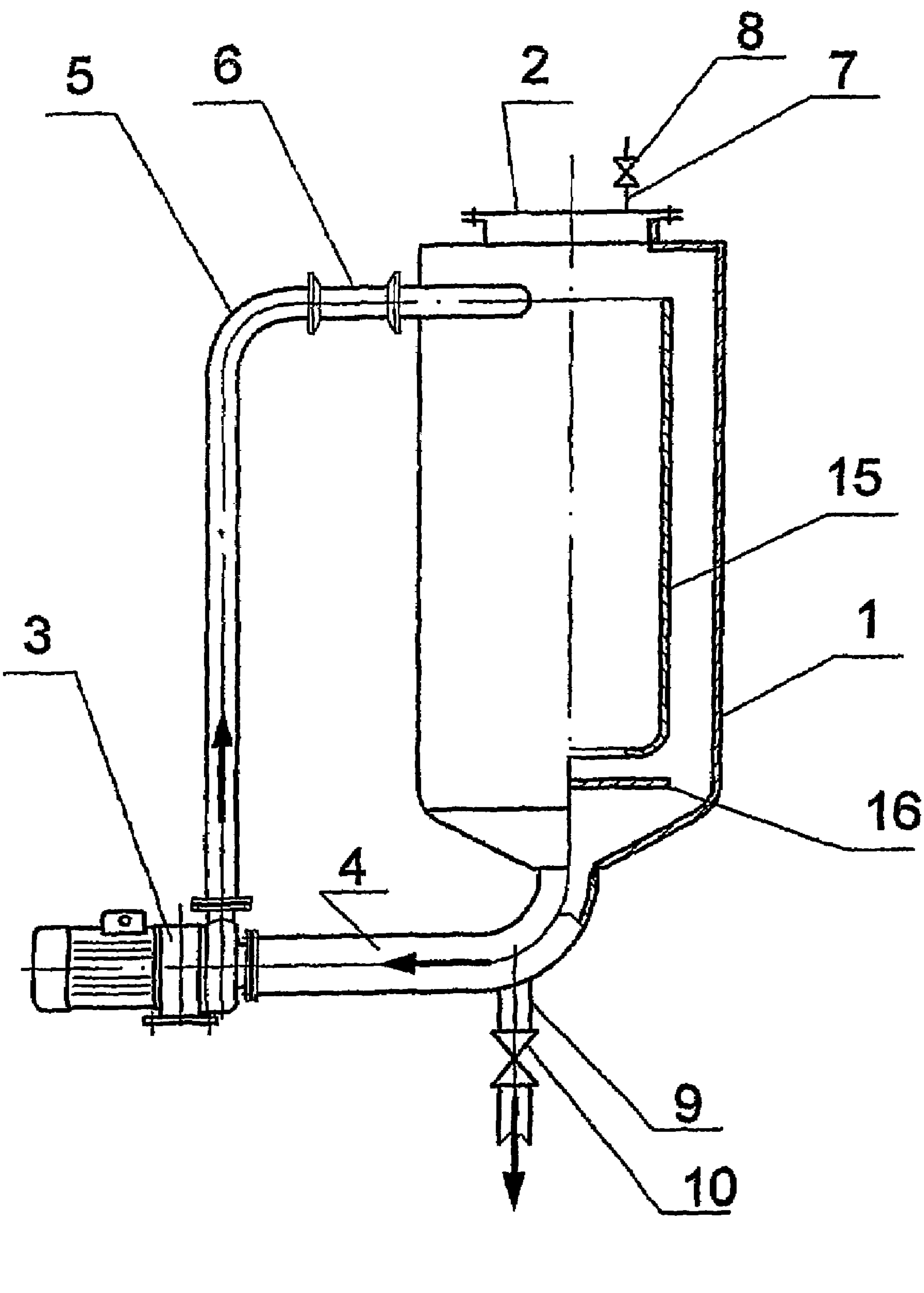
FIG. 4 is a schematic representation of an alternative embodiment of the apparatus of the invention with the flow-through device equipped with a tubular receptacle for receiving a batch of the seeds to be processed.
Figure 5:
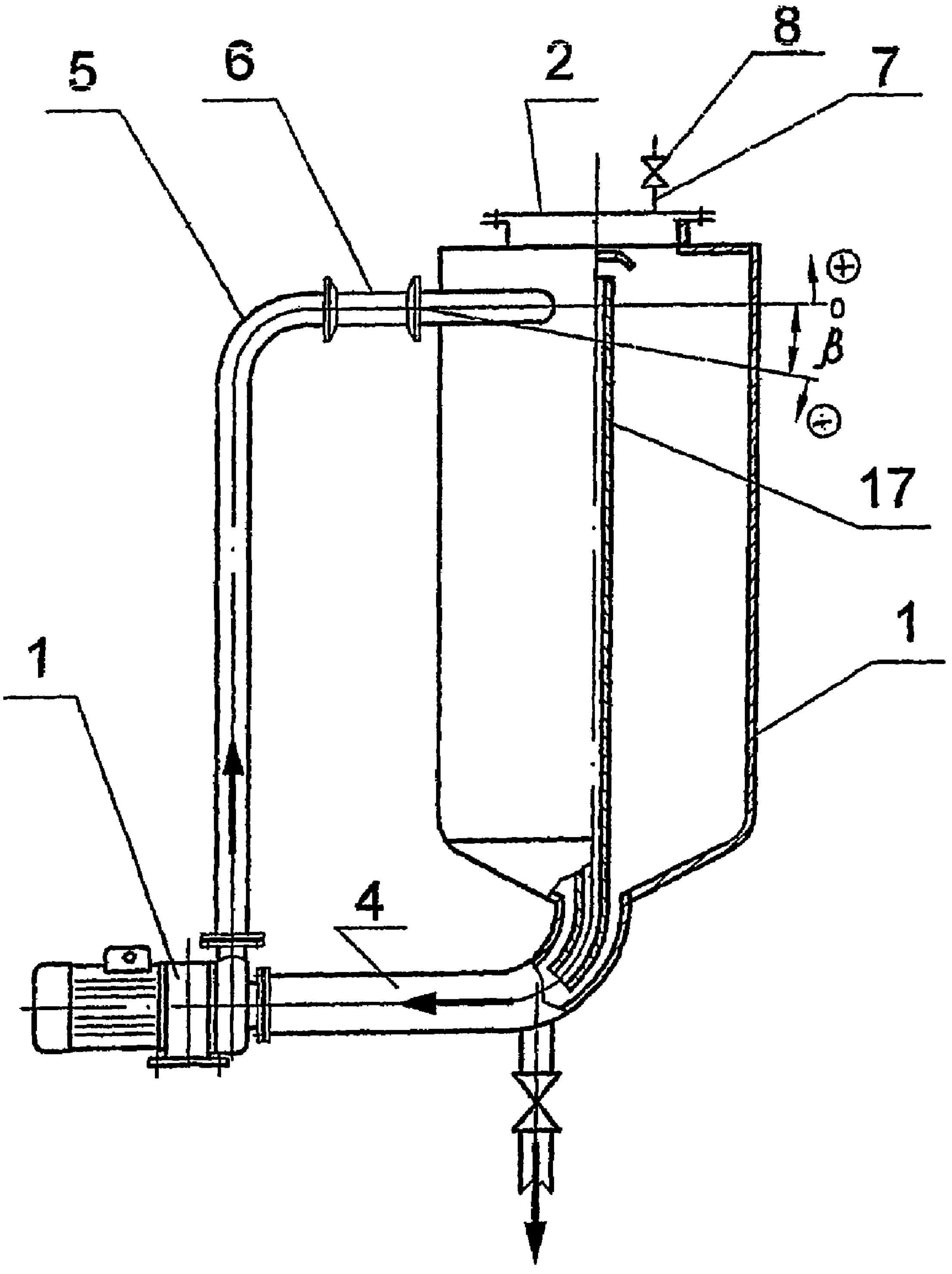
FIG. 5 is a schematic representation of an alternative embodiment of the apparatus of the invention with the flow-through device equipped with an overflow pipe.
Figure 6:
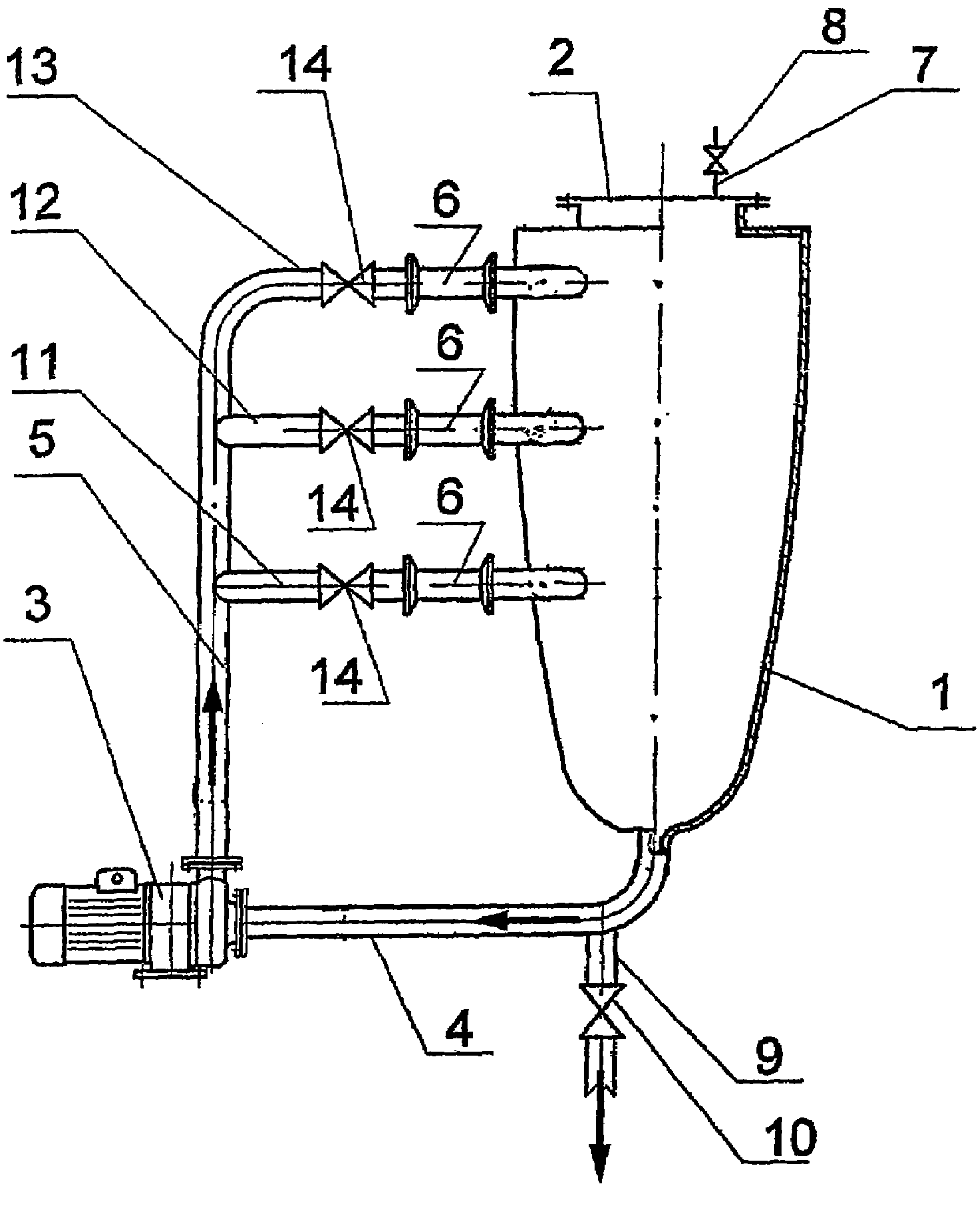
FIG. 6 is a schematic representation of an alternative embodiment of the apparatus of the invention with the flow-through device shaped as a paraboloid and featuring a series of lines for delivering circulating fluid in turbulent flow.

It is desirable that before starting the process and loading seeds, the circulation circuit be filled at least partially, i.e. the suction line 4 and the pump 3, with at least a part of the aqueous medium required for obtaining pasty products of desired consistency. Discrete loading can be done in various ways, for example, (1) the process chamber of the housing 1 shown in FIG. 1, 2 or 6 is filled with a part of the aqueous medium sufficient to prime the suction line 4 and the pump 3; the other part is fed together with a batch of seeds;

(2) with the device shown in FIG. 4, the tubular receptacle 15 with the plate 16 is filled with seeds and the annular space between the receptacle and the wall of the process chamber is filled with an aqueous medium;

(3) with the device shown in FIG. 5, the annular space between the overflow pipe 17 and the wall of the process chamber is filled with seeds and the remaining volume of the circulation circuit is filled with an aqueous medium.

It should be understood that only a movable plate 16 can prevent entry of the seeds into the suction line 4 when the process starts. However, it is practicable to feed the seeds in small amounts; and thus a proper start and stable operation will be achieved.

Actually, the process will start with only the aqueous medium poured in and the suspension of whole or crushed seeds will be formed later as in case (1).

In cases (2) and (3), the aqueous medium flowing around the tubular receptacle 15 (FIG. 4) or from the overflow pipe 17 (FIG. 5) into the suction line 4 will drive the seeds into the circulating flow rather slowly to thus essentially preclude obstruction of the circulation circuit with tough stock.

It is not less important that sticking of the suspension as it becomes more viscous to the walls of the process chamber be precluded. To achieve this objective, the process chamber is configured so that its diameter is decreased in stepwise fashion (FIGS. 1, 4 and 5) and gradually (FIGS. 3 and 6) from top to bottom and the seeds cannot get loose from the flow.

In addition to the above-described passive preclusion of sticking, it is practical to deliver the suspension into the housing 1 in at least two, sometimes three or more, streams variously distant from the bottom of the device as can be seen in FIG. 6. With such an arrangement, the rate of circulation of the suspension can be adjusted to optimize the process by mere control of the valves 11, 12, and 13.

Where the axes of the pipes 11, 12, and 13 are not strictly tangential with respect to the wall of the housing 1, but within the above-described range, particularly the subrange, of feasible angles α, the stability of the circulating flow will be more pronounced.

The angle β can be adjusted with the same objective in view. Any specific angle β is found by trial and error method to suit the suction force of the pump 3 and viscosity of the circulating suspension. This angle depends inversely on the maximum viscosity of the product and the suction force.

Also, to prevent creation of a vacuum as the gases are evacuated from the housing 1, the process chamber is filled with stock, preferably with the aqueous medium.

And finally, to prevent oxidation destruction of oils and proteins, the target product prior to discharging is heated to a temperature not exceeding 100° C.

INDUSTRIAL APPLICABILITY

This invention in all its aspects can be used in industry with the use of simple nonstandard equipment.

It is applicable in the production from vegetable stock of pasty products at least rich in oils of unsaturated fatty acids and in proteins and which satisfy stringent requirements for palatability and stability during prolonged storage.

The invention claimed is:

1. An apparatus for dispersing plant seeds in an aqueous medium, comprising:

- a substantially vertical flow-through device comprising a housing defining an axially symmetric process chamber tapered at the bottom and having a round cross-section, an inlet opening at the top thereof, an opening in the bottom thereof axially aligned with the process chamber, and at least one inlet point above the opening in the bottom of said housing;
- a removable cover having at least one orifice and normally closed on the inlet opening;
- means for discharging gas, said means being in fluid communication with the at least one orifice in said removable cover;
- a continuous-action pump having a suction side and a delivery side;
- a circulation circuit comprising said housing, said continuous-action pump, a suction line connecting the suction side of said continuous-action pump to the opening in the bottom of said housing, a delivery line connecting the delivery side of said continuous-action pump to said housing at the at least one inlet point for injecting seeds in an aqueous medium through the at least one inlet point into the process chamber at an angle (α) formed between the axis of the delivery line and the radius of the circumference of the axially symmetric round process chamber, wherein the radius is drawn from the center of the circumference to the at least one inlet point and the angle (α) is within range of $30° \leqq \alpha < 90°$;
- at least one means for stimulating turbulent flow of seeds in an aqueous medium, incorporated into said delivery line upstream of the at least one inlet point;
- an end product discharge line connected to said suction line; and
- at least two valves, one to control said means for discharging gas and another to control said end product discharge line.

2. The apparatus of claim 1, wherein the process chamber is defined by a cylindrical surface at the upper portion thereof and by a conical surface at the lower portion, both surfaces being smoothly conjoint.

3. The apparatus of claim 1, wherein the process chamber is defined by a paraboloidal surface.

4. The apparatus of claim 1, wherein the process chamber is defined by a spheroidal surface.

5. The apparatus of any one of claims 1-4, wherein the angle (α) is within the range of $60° \leqq \alpha < 90°$.

6. The apparatus of any one of claims 1-4, wherein said delivery line is provided with a branch line connecting the delivery side of said continuous-action pump to said housing at a further inlet point for injecting seeds in an aqueous medium into the process chamber at the angle (α), and wherein the further inlet point being arranged at a level different from that of the inlet point at which said delivery line connects the delivery side of said continuous-action pump to said housing.

7. The apparatus of claim 6, wherein each of said delivery line and said branch line is provided with a valve.

8. The apparatus of any one of claims 1-4, further comprising a tubular receptacle for a batch of seeds to be dispersed, said tubular receptacle being coaxially set up within the process chamber above the opening in the bottom of said housing, having an upper end open and flush level with the at least one inlet point to the process chamber and a lower end being provided with a coaxially arranged plate to slow down the seeds leaving the tubular receptacle.

9. The apparatus of any one of claims 1-4, further comprising an overflow pipe coaxially set up within the process chamber, having an open upper end disposed above the at least one inlet point to the chamber and a lower end extending in annular space relationship within said suction line along a section thereof.

* * * * *